United States Patent
Arden et al.

[15] 3,674,685
[45] July 4, 1972

[54] PROCESS OF AND APPARATUS FOR THE ION-EXCHANGE TREATMENT OF LIQUIDS

[72] Inventors: Thomas Victor Arden, Cobham; Albert George Borra, Isleworth; Rolf Crowther Clayton, London, all of England

[73] Assignee: The Permutit Company Limited, London, England

[22] Filed: Aug. 15, 1969

[21] Appl. No.: 850,457

[30] Foreign Application Priority Data

Aug. 22, 1968 Great Britain......................40,239/68
March 17, 1969 Great Britain......................13,926/69

[52] U.S. Cl..............................................210/33, 210/189
[51] Int. Cl................................................B01d 15/06
[58] Field of Search..........................................210/33, 189

[56] References Cited
UNITED STATES PATENTS

| | | | |
|---|---|---|---|
| 3,575,294 | 4/1971 | Hirowatari | 210/189 |
| 3,200,067 | 8/1965 | Levendusky | 210/33 X |
| 3,244,561 | 4/1966 | Mihara et al. | 210/33 X |
| 3,378,339 | 4/1968 | Yamashiki | 210/189 X |

Primary Examiner—Samih N. Zaharna
Attorney—Larson, Taylor and Hinds

[57] ABSTRACT

In a continuous ion-exchange process in which resin moves intermittently through a circuit including an absorber and a regenerator, the absorber is spanned by a liquid-distributing system, and at each intermittent movement a slug of resin wholly occupying the space in the absorber between this system and one end of the absorber is discharged while service flow continues. The remainder of the bed in the absorber is moved in the direction of the space thus emptied so as to fill it again and a slug of regenerated resin of identical volume is introduced into the other end of the absorber.

11 Claims, 11 Drawing Figures

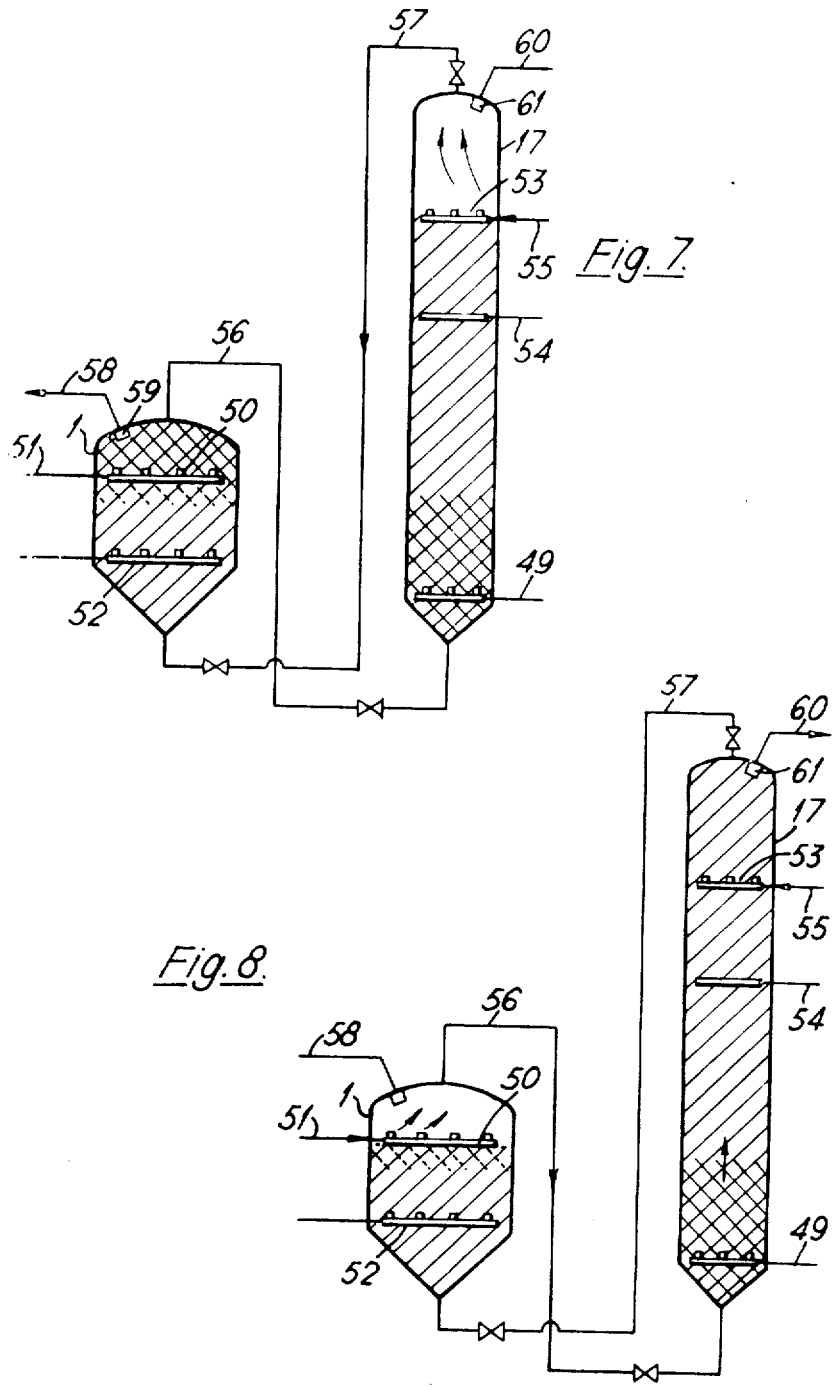

PROCESS OF AND APPARATUS FOR THE ION-EXCHANGE TREATMENT OF LIQUIDS

This invention relates to ion-processes and plants of the kind in which a bed of ion-exchange resin particles, usually beads, in an absorber is traversed by a liquid (which may be in the form of slurry) while exchange of ions takes place between the resin and the liquid, and intermittently resin at the liquid-inlet end of the absorber is removed from the bed and moved through a closed circuit that includes a bed of resin in a regenerator in which ions taken up by the resin in the absorber are removed by a regenerant and the regenerated resin is returned to the liquid-outlet end of the absorber through the circuit. Numerous processes of this kind, commonly called "continuous", are known. In them the flow through the absorber must be interrupted when the resin is moved, but the duration of the interruption is much less than when the bed is static and is regenerated in the absorber, as in the common processes for demineralising or softening water.

Our object in this invention is to improve processes of this kind.

At each intermittent movement in a process according to the invention a slug of resin wholly occupying a space in the absorber defined by a transverse device through which the resin can pass and by one end of the absorber is discharged from the absorber while service flow, that is the flow of liquid under treatment through the absorber, continues; the remainder of the bed in the absorber is moved in the direction of the space thus emptied so as to fill it again; and a slug of regenerated resin of identical volume is introduced into the other end of the absorber. Thus service flow is interrupted, if at all, only to allow the movement of the remainder of the bed in the absorber.

Preferably the regenerated slug that is introduced into the absorber is resin wholly occupying a space in the regenerator defined by another transverse device through which the resin can pass and by one end of the regenerator, and when this slug has been discharged the remainder of the bed in the regenerator is moved in the direction of the space thus emptied so as to fill it again.

In both vessels (absorber and regenerator) the liquid flow may be in either direction, but preferably is the same in both, the movements of resin in, from and to the absorber and regenerator being effected simultaneously in an identical manner. Advantageously the liquid flow is upwards in each vessel. In this case the resin below the transverse device is flushed out of the vessel at each movement. During this flushing step the bed above the transverse device must not move downwards through it, because if it did there would be no control over the volume of the slug of resin moved. It is known that if a liquid is introduced into a bed of resin particles in which there is an appropriate device constructed to allow the beads to move downwards through openings in it, and the liquid flows upwards through the openings, even at a fairly low rate of flow, the bed or that part of it above the device will in effect be supported by the liquid and will not move downwards through the device against the upwardly flowing liquid. When the liquid flow in either vessel is upwards the transverse device in that vessel is of this kind, and the number and spacing of the openings and the proportion of its cross-sectional area constituted by the openings must not be too large, as is well known. 30 percent is found to be a satisfactory proportion of the area available for the passage of resin.

The transverse device may be a plate, the liquid being introduced upstream of it. However, it is preferably also constructed for the introduction of the liquid, being of the kind commonly known as a "liquid-distributing system". One common form of liquid-distributing system is a grid of pipes with openings spaced along them. Since a distributing system may also be used as a collecting system on the reversal of the flow of liquid, it is common to provide straining devices of some form or another to prevent the passage of the resin beads into the pipes of the distributing system.

Liquid-distributing systems normally occupy a much smaller proportion of the cross-sectional area of the vessel than is required by a transverse device that is to hold a resin bed up during the flushing step, so if one is used as the transverse device the pipes in it must be more closely spaced than usual, preferably occupying at least 60 percent of the cross-sectional area of the vessel.

When the flow of liquid through either vessel is downwards, the resin slug that is flushed out is at the top of the vessel, and there is no need to introduce liquid through the transverse device in order to support the bed. Nevertheless it is preferably a liquid-distributing system, since if a resin slug is to be completely flushed out upwards the flushing liquid is best introduced beneath it at a number of points. Such a liquid-distributing system may be of the normal kind, blocking only, say, 20 percent or 30 percent of the cross-sectional area.

With upward flow of liquid and downward movement of resin, it is preferred not to rely on gravity to move the bed downwards to refill the space left empty by the flushing of a slug of resin from the bottom of the vessel, but to bring about this downward movement by liquid introduced under pressure into the top of the vessel. The downward movement of the bed is effected or accelerated in this way and yet there is a minimum of disturbance of the bed itself.

In a vessel in which the liquid flow is downwards and the slug is discharged from the top, this slug together with the remainder of the bed is moved upwards by resin transferred to the bottom of the vessel from the second vessel. Thereafter this slug is flushed out of the top of the first vessel, and if the liquid flow in the second vessel is also downwards the slug thus flushed out is introduced into the bottom of the second vessel to move the bed in it upwards.

It is desirable that the flow to service should, if possible, be at a constant rate at all times. A further feature of the invention consists in increasing the rate of flow of the liquid entering the absorber while the slug of resin is being flushed out, in order to maintain the rate of flow of liquid to service during this flushing step and to support the bed if the liquid flow is upwards.

When the bed in the absorber is being moved as a whole the service flow may be interrupted. However, even this short interruption may be avoided by yet another feature of the invention. This consists in taking liquid from the supply of liquid to be treated, passing it through regenerated resin in the regenerator and feeding it to service so as to maintain the rate of service flow.

Commonly the resin must be rinsed to free it from regenerant and the products of regeneration after it has been regenerated. In the invention, the regenerated resin is preferably also rinsed in the regenerator and returned direct from it to the absorber, so that there are only the two main vessels. However, a third vessel may be provided for rinsing if desired, being similarly spanned by a transverse device at a height such as to define with one or other end of the vessel the same volume of one slug. In this case each slug is moved in turn from the absorber to the regenerator, from the regenerator to the rinsing vessel, and from the rinsing vessel back to the absorber.

The invention is particularly applicable to the softening or demineralisation of water, in which the common practice is to pass the water upwards through the bed in the absorber. In softening, this bed is a cation resin with exchangeable sodium ions. In demineralisation, the water must exchange the cations of the salts dissolved in it for hydrogen and the anions of those salts for hydroxyl ions, and this may be done by passing the water in succession through a bed of cation-exchange resin charged with hydrogen ions and a bed of anion-exchange resin in the free-base or hydroxide state. In a complete plant for demineralisation, there may thus be a vessel containing the cation resin in closed circuit with a regenerator for this resin, and another vessel containing the anion resin in closed circuit with a regenerator for that resin, the process in each closed circuit being carried on in accordance with the invention. The invention may, however, also be applied to processes carried on in order to recover a valuable ion from solution, either from a clear liquor or from a liquor containing suspended solids, for example to processes for the recovery of uranium.

The invention includes an ion-exchange plant comprising two vessels (absorber and regenerator) each spanned by a transverse device at such a distance from an end of the vessel as to define space equal in volume to similarly defined in the other vessel, the two vessels being arranged in closed circuit to enable the process of the invention to be carried out.

The invention will now be described in more detail by reference to the accompanying drawings, in which:

FIGS. 6 to 8 are diagrams of a similar nature to FIGS. 2 to 5 illustrating stages in a plant in which the flow of liquid in both vessels is downwards;

Figure 1:
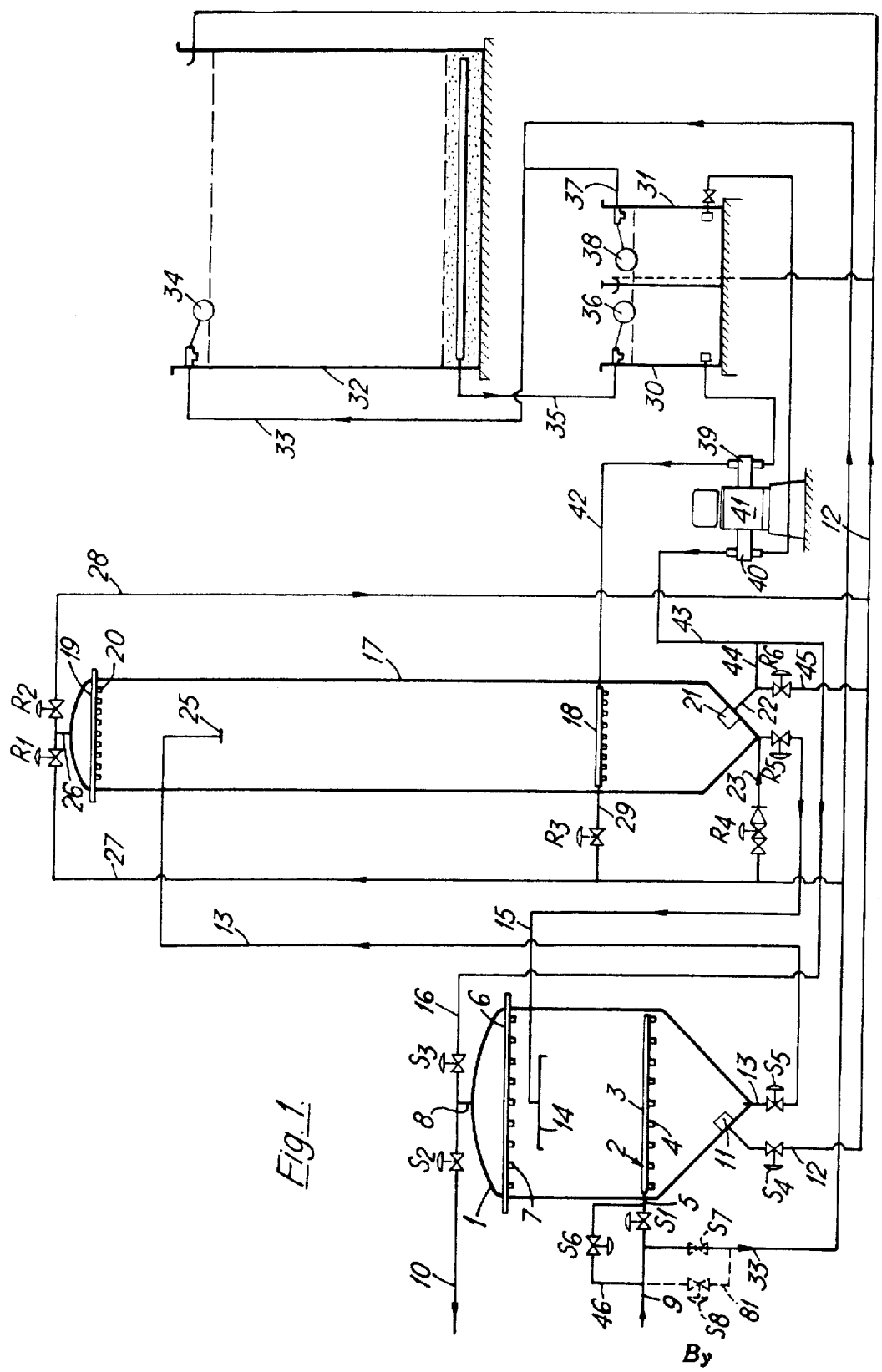
FIG. 1 shows diagrammatically the preferred form of plant for softening water.

Referring first to FIG. 1, the absorber or softener, shown at 1, is a cylindrical vessel with a domed top and a conical bottom. It is spanned by a water-distributing system 2 which comprises a grid of pipes 3 occupying, say, 70 percent of the cross-sectional area of the vessel, the pipes 3 having openings protected by strainers 4 on their undersides. This water-distributing system 2 is connected to an inlet pipe 5 controlled by a valve S1. The vessel 1 is spanned at the top by a plate 6 that has a large number of openings protected on the underside by strainers 7 so that liquid can pass upwards through the plate 6 but resin cannot. At the top of the domed space above the plate 6 there is a pipe 8 through which water can leave or enter the space.

The vessel 1 is designed to hold three slugs of resin in the space between the plate 6 and the distributing system 2, and the conical space below that system is of the volume of one slug.

In operation water to be softened flowing from a main supply pipe 9 passes through the pipe 5 into the vessel, flows up through the resin bed, and leaves through the pipe 8 and flows to service through a pipe 10 controlled by a valve S2.

There are two outlets from the conical space below the distributing system 2, one of which is covered by a strainer 11 so that water but not resin can pass through this outlet to a pipe 12, which leads to drain and is controlled by a valve S4. The second of these outlets from the conical space is connected to a pipe 13 through which resin can be discharged from the vessel 1 and which is controlled by a valve S5.

Finally, the vessel 1 contains a device 14 connected to a pipe 15 through which resin can be introduced, and the pipe 8 is connected to a further pipe 16 through which water can be introduced into the top of the vessel 1 under pressure and which is controlled by a valve S3.

The regenerator is shown at 17, is a taller and narrower vessel than the absorber 1, and is of size such as to hold five resin slugs. It is spanned by a liquid-distributing system 18, which is similar in construction to the system 2, and which is at such a height in the regenerator that the volume below it is that of one slug. At the top the regenerator is spanned by a plate 19 similar to the plate 6 and furnished with strainers 20. The space inside the regenerator above the plate 18 is connected by a pipe 26 to two pipes 27 and 28 respectively controlled by valves R1 and R2. The pipe 27 serves for the introduction of water under pressure to move the resin bed in the regenerator downwards, and the pipe 28 leads to drain, in fact joining the pipe 12. At the bottom the regenerator has two openings, one being spanned by a strainer 21 and connected to a pipe 22, and the other being connected both to the pipe 15, which is controlled by a valve R5, and to a pipe 23, which is controlled by a non-return valve R4.

The regenerator also contains a device 25 connected to the pipe 13 through which resin can be introduced.

The plant shown also includes a brine tank 30, a water tank 31 and a salt-storage tank 32. A pipe 33 branches from the main water supply pipe 9 to supply water to the tank 32 under the control of a ball valve 34. At the bottom of the tank 32 a pipe 35 runs to the brine tank 30 to charge it with a concentrated solution of brine under the control of a ball valve 36. A pipe 37 branches from the pipe 33 to maintain the water tank 31 full of water under the control of a ball valve 38. Two positive displacement pumps 39 and 40 driven by a single motor 41 serve respectively to draw brine from the tank 30 and water from the tank 31, the brine being delivered through a pipe 42 as regenerant to the distributing system 18, and the water being delivered through pipes 43 and 44 and the pipe 22 to the bottom of the regenerator. Water thus delivered simultaneously with the brine to the regenerator flows upwards to dilute the brine to a suitable concentration for regenerating purposes, this water also partially rinsing the resin slug below the distributing system 18. The pumps 39 and 40 are run for specific periods of time and so deliver measured quantities of liquid. Because they are of the positive displacement type, they prevent reverse flow of liquid in the pipes 42 and 43 when they are not running.

Four stages in the process are illustrated by FIGS. 2 to 5, each of which shows by arrows the flows during the stage and the position of the resin at the end of the stage.

Figure 2:
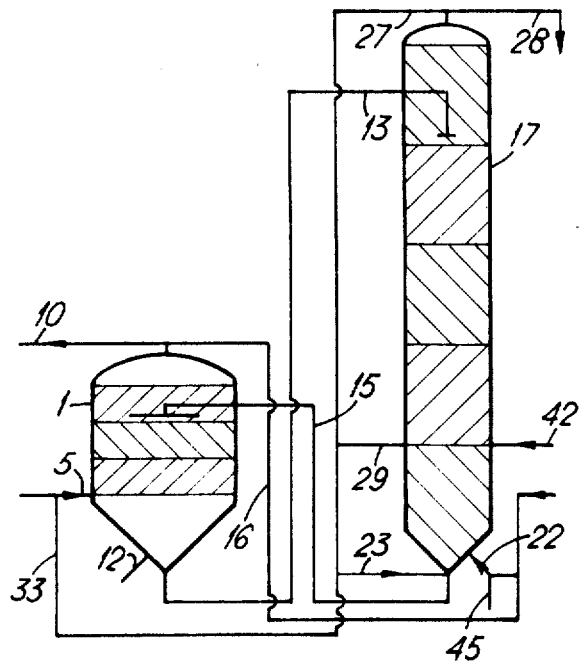
FIGS. 2 to 5 show even more diagrammatically the position of the resin at the end of various stages in the process.

It is convenient to consider the cycle of operations as starting with three slugs of resin in the softener 1 between the plate 6 and the distributing system 2, the conical space below the system being devoid of resin but full of water. The valves S1 and S2 are open and water flows into the softener, upwards through the resin and to service through the pipe 10 as treated water. The fact that the incoming water is directed downwards from the distributing system 2 and accordingly has to turn round and flow upwards is of assistance in maintaining the resin bed in position above the system 2. At this time there are five slugs in the regenerator, as shown in FIG. 2.

During this normal flow to service regenerant is supplied to the regenerator as described above by the operation of the pumps 39 and 40, the valve R2 being opened and the waste regenerant flowing down the pipe 28 to drain. When the measured quantities of regenerant and diluting water have been introduced, the pumps are stopped and the valve R4 is opened to admit rinsing water through the pipes 27 and 23 to flow upwards through the bottom slug and then onwards, also to escape through the pipe 28.

Figure 3:
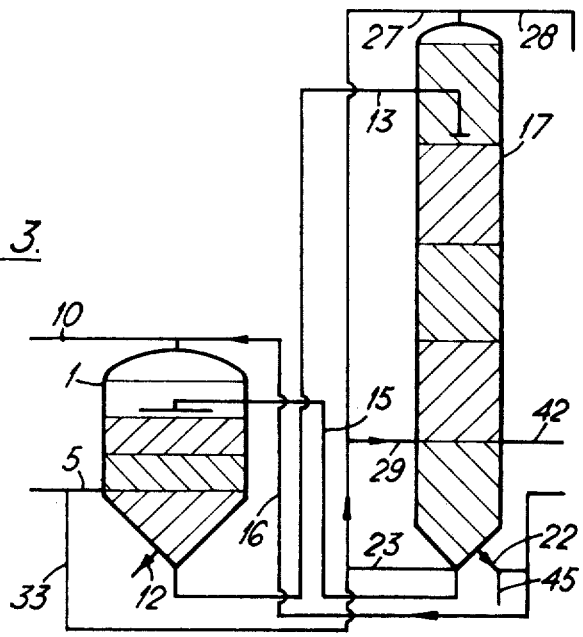

When resin transfer is to take place, the valves S1, S2 and R2 are shut, and the valves S3 and S4 are opened, as is a valve R3 in a pipe 29 which branches from the pipe 27 to the distributing system 18. Water now flows from the main supply pipe 9 through the pipes 23 and 29 to the distributing system 18, and out of the regenerator to flow through the pipes 22, 44, 16 and 8 to the top of the softener 1. Under the pressure of this water, the resin bed in the softener is driven downwards, the lower part of the bed passing the distributing system 2 and forming a slug which occupies the conical space at the bottom of the softener. The water in that space flows through the pipe 12 to drain. At the end of this stage the position of the resin slugs is as shown in FIG. 3.

Figure 4:
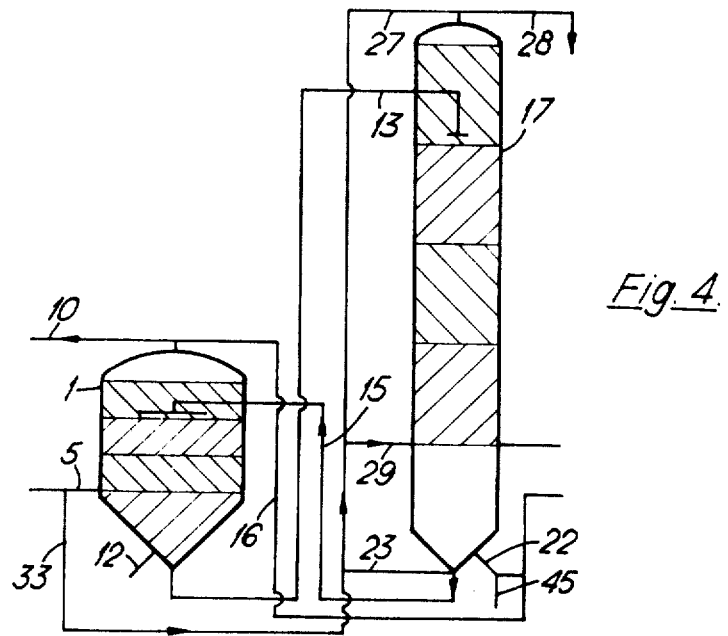

Next the valves S3 and S4 are shut again, and the valves S2, R3 and R5 are opened, the remaining valves that control the regenerator being shut. The water under pressure entering the regenerator through the distributing system 18 now drives a washed and regenerated slug of resin through the pipe 15 into the softener to form the top slug in it. A small proportion of the water flows upwards to drain through the valve R2 and the pipe 28, this upward flow serving to keep the bed above the distributing system 18 in a packed state. In the softener the water displaced by the resin flows to service through the pipe 10. At the end of this stage the softener is wholly full of resin, as shown by FIG. 4.

Figure 5:
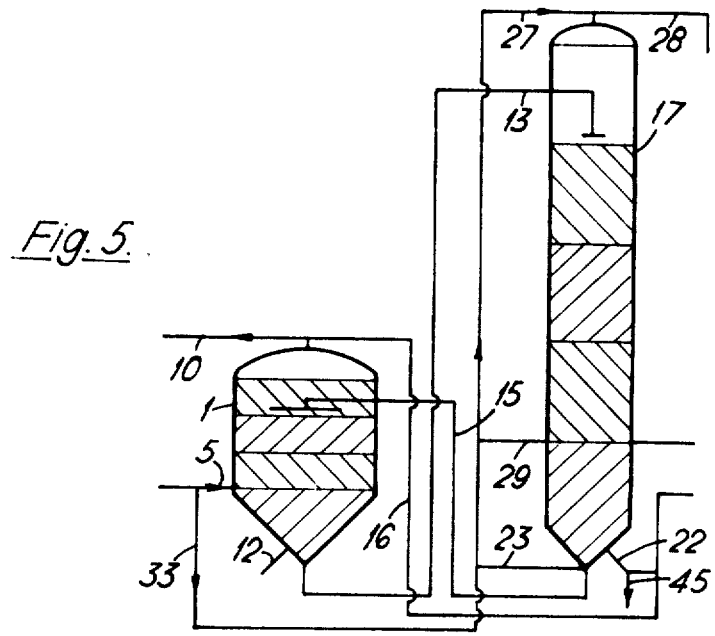

With the softener again full it is possible to resume flow to service, and accordingly the valve S1 is opened, the valves R2, R3 and R5 being shut. Simultaneously the valve R1, and a valve R6 in a pipe 45 which runs from the pipe 22 to the drain pipe 12, are opened. Water from the pipe 33 now flows through the pipe 27 into the top of the regenerator and forces the resin in it downwards, so that the space below the distributing system 18 is filled with resin. The position of the resin slugs is then as shown in FIG. 5.

Next the slug of resin in the bottom of the softener 1 is moved to the regenerator. To enable this to be done, the valves R1 and R6 are shut, and the valves S5 and R2 are opened. In addition, a valve S6 in a pipe 46 that by-passes the valve S1 is opened, so that the rate of flow into the softener is increased. The resin slug in the bottom of the softener is flushed out by water entering through the distributing system 2 and is carried upwards through the pipe 13 to the device 25 in the regenerator. During this operation, which may last about 90 seconds, water continues to flow to service at the same rate as before, since the extra volume of water introduced by opening the valve S6 is what is required to transfer the slug of resin. At the end of this operation, the position is once more as shown in FIG. 2, except of course that each slug has moved on through one stage.

In the process thus described in detail the flow to service is interrupted for the short space of time in which the bed is being moved downwards by the flows illustrated by FIG. 3. This interruption can be avoided completely if the flow at this stage through the pipe 33 is made high and the valve S2 is opened. The raw water entering the regenerator through the pipe 29 is softened in passing through the bottom of the regenerator and accordingly can flow to service as softened water. A convenient way of producing the desired rate of flow through the pipe 33 is to insert in that pipe a valve S7, as shown in dotted lines in FIG. 1, this valve being normally open to allow flow through the pipe 33 at an appropriate rate to maintain the tanks 31 and 32 full; and to provide a by-pass 81 controlled by a valve S8 around the valve S7. Then when the valves already described are set to provide the flows illustrated by FIG. 3, the valve S8 is also opened to allow the high flow now required through the pipes 33 and 29.

Various modifications may be made to the plant shown diagrammatically in FIG. 1. For example, it is not necessary for the softener to hold three slugs of resin, as it may hold two slugs or indeed any amount of resin greater than the volume of two slugs. Similarly the regenerator may be designed to hold any appropriate volume of resin. Again, it is convenient to make the regenerator taller and narrower than the softener, because of the different rates of flow of liquid through the two vessels, but this is not essential. They could indeed be of the same size and shape.

Figure 6:
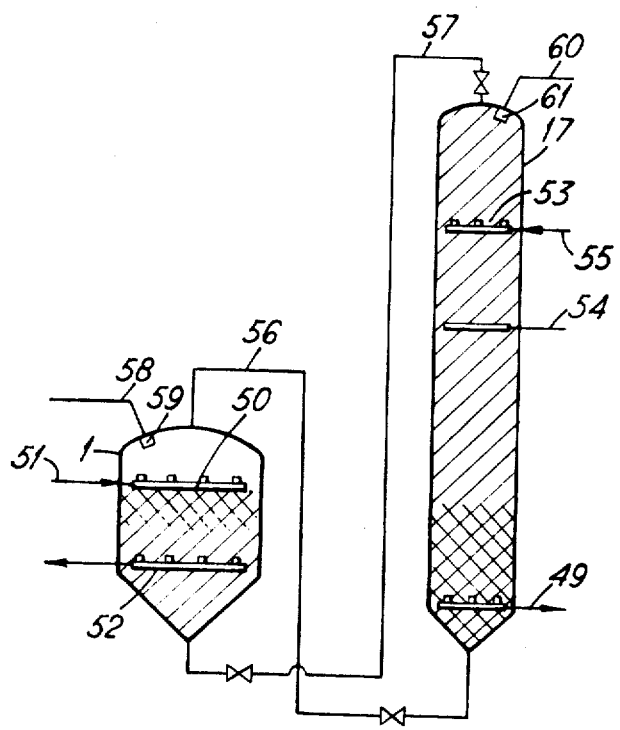

FIGS. 6 to 8 show a modification in which the flow of liquid is downwards in both the vessels.

In the softener a liquid-distributing system 50 is arranged at such a distance from the top of the softener as to define an empty space equal to the volume of one slug as shown in FIG. 6. The main water inlet is shown at 51. The treated water enters a collecting system 52 close to the bottom of the softener. In the regenerator 17 there is a distributing system 53 for rinsing water, a distributing system 54 for brine and a collecting system 49 for the removal of the spent brine regenerant and rinsing water. Water is introduced into the regenerator through a pipe 55. The top of the softener 1 is connected to the bottom of the regenerator by a pipe 56 through which exhausted slugs of resin are transferred from the one vessel to the other, and regenerated slugs are transferred from the top of the regenerator to the bottom of the softener through a pipe 57.

Considering only the resin movement and starting with the resin position shown in FIG. 6, in which softening and regeneration are both taking place, the top slug of resin in the regenerator is flushed out by water introduced through the pipe 55. This slug flows through the pipe 57 to enter the bottom of the softener, there lifting the whole bed while the carrier water escapes through an outlet pipe 58, the inlet to which is covered by a strainer 59. At the end of this operation the resin position is as shown in FIG. 7. Next, as shown by arrows in FIG. 8, the top and exhausted slug of resin now existing above the distributing system 50 in the softener is flushed out by water introduced through the pipe 51 and enters the bottom of the regenerator, driving the resin left in that regenerator upwards to fill it. Excess carrier water escapes through a pipe 60, the inlet of which is covered by a strainer 61. At the end of this operation the resin position is as shown in FIG. 8.

Figure 9:
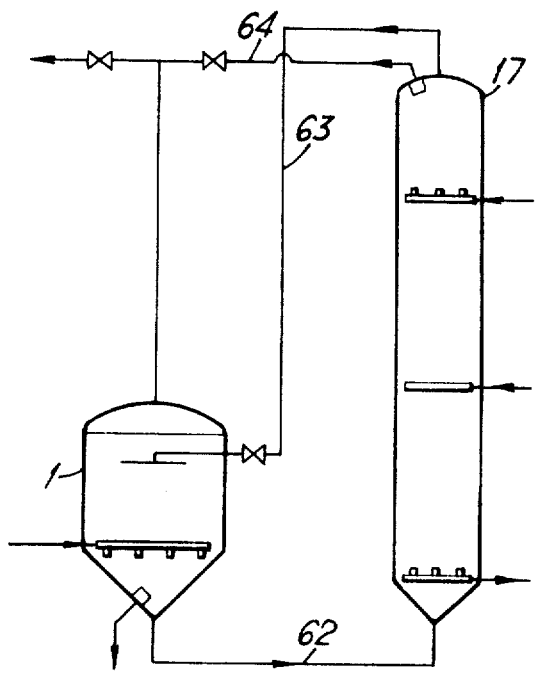
FIG. 9 shows diagrammatically the circuit in a plant in which the flow of liquid in the absorber is upwards and that in the regenerator downwards.

It will readily be understood that the liquid flow may be upwards in one vessel and downwards in the other. FIG. 9 shows diagrammatically the connections required when the flow is upwards in the softener 1 and downwards in the regenerator 17. The bottom of the softener is connected to the bottom of the regenerator by a pipe 62 for the transfer of exhausted resin, and the top of the regenerator is connected to a resin inlet in the softener by a pipe 63. The water required to force the resin bed in the softener 1 downwards is taken from the top of the regenerator through a pipe 64 to the top of the softener. The arrows merely show the directions of flow, and do not indicate any given stage.

Figure 10:
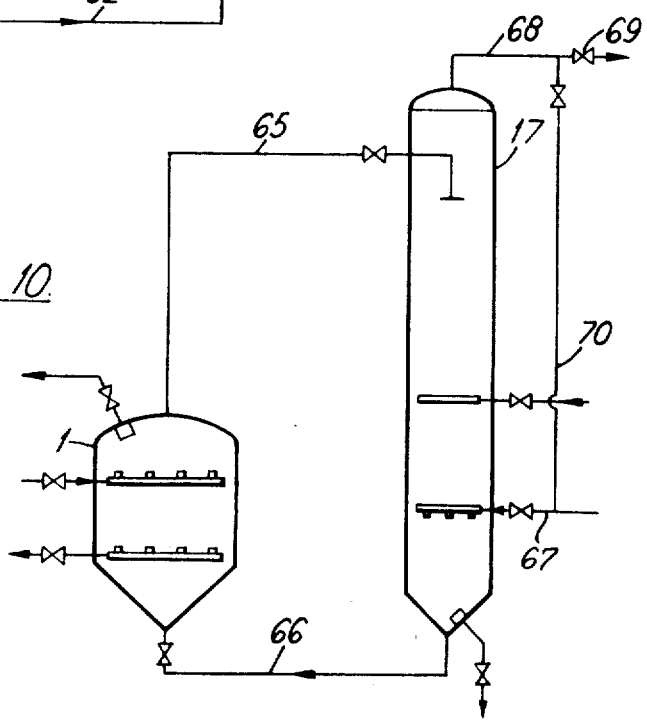
FIG. 10 shows similarly diagrammatically a circuit in which the flow in the absorber is downwards and that in the regenerator is upwards.

FIG. 10 shows, similarly to FIG. 9, a plant in which the flow in the softener is downwards and that in the regenerator upwards. In this case there is a pipe 65 for the transfer of exhausted slugs of resin from the top of the softener to the top of the regenerator, and a pipe 66 for the transfer of regenerated slugs from the bottom of the regenerator to the bottom of the softener. The rinsing water and that required for the resin movement out of the regenerator is introduced through a pipe 67, flowing to drain through a pipe 68 controlled by a valve 69. Water required to force the resin bed in the regenerator downwards after the transfer of a regenerated slug to the softener flows through a pipe 70 branching from the pipe 67 and through the pipe 68 to the top of the regenerator.

Various other modifications may be made. Thus with upward flow of liquid the resin slug can be discharged from the absorber by allowing some of the incoming liquid, that is to say the water introduced through the pipe 5 in FIG. 1, to flow through the space below the transverse device and out of the bottom of the absorber at a slow rate, carrying resin with it. If this is done, there is no need to increase the rate of liquid entering the absorber in order to maintain the service flow constant.

Again, the liquid required to move the resin slug out of the regenerator may be introduced, not through the regenerant distributing system, but through a separate valve-controlled pipe.

Figure 11:
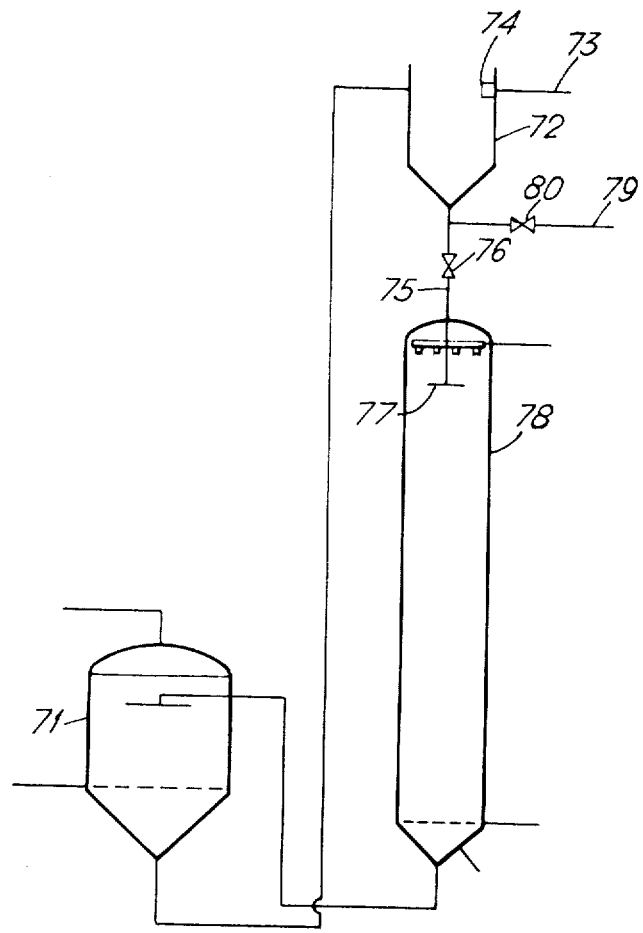
FIG. 11 shows a further modification.

FIG. 11 shows a modification when the invention is applied to the recovery of uranium or other valuable ions; in this case account must be taken of the fact that the object is to separate uranium in the pregnant uranium liquor from other ions, and that this liquor is used to carry the slugs from the absorber. Before the uranium is eluted in the regenerator and recovered, it is highly desirable to rinse the slug with water. Therefore the slug is not transferred straight from the absorber to the regenerator, but rather is taken from the bottom of the absorber, shown at 71, to a washing vessel 72. This vessel is open-topped and of a volume such as to hold a little more than one slug. It has an overflow pipe 73 the inlet of which is covered by a screen 74 through which water but not resin can pass.

The bottom of the washing vessel 72 is connected by a pipe 75 controlled by a valve 76 to a resin inlet 77 in the regenerator, which is shown at 78. Water can be introduced into the washing vessel through a pipe 79 controlled by a valve 80, this pipe conveniently branching from the pipe 75. When a slug has entered the washing vessel 72 the valve 80 is opened to allow water to flow upwards, rinsing the slug and leaving the vessel 72 by the pipe 73. To avoid loss of uranium, this rinsing water may be returned to the source of the pregnant liquor. When the slug has been thus freed from pregnant liquor, the valve can be changed to allow the slug to enter the regenerator, where it is regenerated in the same way as in the process illustrated by FIG. 1.

A washing vessel may be a closed pressure vessel instead of being open-topped, the pregnant liquor carried into it then being displaced through an outlet such as the pipe 73 by water under pressure.

Finally, it will of course be understood that all the valve movements described are normally effected automatically under the control of timing instruments, the valves themselves being electrically or pneumatically operated, as is common in the art of ion exchange.

We claim:

1. An ion-exchange process in which a bed of ion-exchange resin particles in an absorber is traversed by a liquid while exchange of ions takes place between the resin and the liquid, the liquid flows from the bed to service, and intermittently resin at the liquid-inlet end of the absorber is removed from the bed and moved through a closed circuit that includes a bed of resin in a regenerator in which ions taken up by the resin in the absorber are removed by a regenerant and the regenerated resin, after being rinsed in the regenerator to free it from excess regenerant and the products of regeneration, is returned to the liquid-outlet end of the absorber through the circuit, characterized by the features that at each intermittent movement:
   1. a space in the absorber defined by a transverse device through which the resin can pass and by one end of the absorber is filled by a slug of resin by moving resin in the absorber towards and into that space;
   2. the resin that is returned to the absorber is constituted by a slug of regenerated and rinsed resin which occupies the whole of a space in the regenerator defined by another transverse device through which the resin can pass and by one end of the regenerator, this space holding the same quantity of resin as the space similarly defined in the absorber, and is discharged direct to the absorber;
   3. the defined space in the regenerator is filled by moving resin in the regenerator towards and into that space;
   4. the resin that is removed from the absorber to the regenerator is constituted by the slug of resin in the absorber and is transferred direct from the absorber to the regenerator while service flow continues.

2. A process according to claim 1 in which the liquid flow is upwards in both the absorber and the regenerator.

3. A process according to claim 1 in which liquid taken from the supply of liquid to be treated is passed through regenerated resin in the regenerator and fed to service while the bed in the absorber is being moved as a whole.

4. A process according to claim 1 in which the liquid flow is upwards in the absorber and the downward movement of the bed into the space emptied by the discharge of the slug is effected or accelerated by liquid under pressure introduced into the top of the absorber.

5. A process according to claim 4 in which the liquid that exerts the pressure on the top of the bed is branched from that flowing to service from the regenerator.

6. A process according to claim 1 in which the rate of flow of the liquid entering the absorber is increased while the slug of resin is being flushed out, in order to maintain the rate of flow of liquid to service during this flushing step.

7. A process according to claim 1 employed in the softening or demineralization of water.

8. An ion-exchange plant suitable for use in a process according to claim 1 and comprising two vessels each spanned by a transverse device at such a distance from an end of the vessel as to define a space holding the same quantity of resin as that similarly defined in the other vessel, the vessels being arranged in a closed circuit constituted solely by the vessels and valve-controlled pipes, each running from one vessel and terminating in another, to allow resin to flow from vessel to vessel.

9. A plant according to claim 8 in which the spaces defined by the transverse devices are at the bottom of both vessels.

10. An ion-exchange process in which a bed of ion-exchange resin particles in an absorber is traversed by a liquid while exchange of ions takes place between the resin and the liquid, the liquid flows from the bed to service, and intermittently resin at the liquid-inlet end of the absorber is removed from the bed and moved through a closed circuit that includes a bed of resin in a regenerator in which ions taken up by the resin in the absorber are removed by a regenerant and the regenerated resin, after being rinsed in a rinser to free it from excess regenerant and the products of regeneration, is returned to the liquid-outlet end of the absorber through the circuit, characterized by the features that at each intermittent movement:
   1. a space in the absorber defined by a transverse device through which the resin can pass and by one end of the absorber is filled by a slug of resin by moving resin in the absorber towards and into that space;
   2. the resin that is returned to the absorber is constituted by a slug of regenerated and rinsed resin which occupies the whole of a space in the rinser defined by another transverse device through which the resin can pass and by one end of the rinser, this space holding the same quantity of resin as the space similarly defined in the absorber, and is discharged direct to the absorber;
   3. the defined space in the rinser is filled by moving resin in the rinser towards and into that space;
   4. the resin that is removed from the absorber to the regenerator is constituted by the slug of resin in the absorber and is transferred direct from the absorber to the regenerator while service flow continues.

11. An ion-exchange plant suitable for use in a process according to claim 38 and comprising three vessels, namely an absorber, a regenerator and a rinser, each spanned by a transverse device at such a distance from an end of the vessel as to define a space holding the same quantity of resin as that similarly defined in the other vessels, the vessels being arranged in a closed circuit constituted solely by the vessels and valve-controlled pipes, each running from one vessel and terminating in another, to allow resin to flow from vessel to vessel.

* * * * *